US009896912B2

United States Patent
Tegeler et al.

(10) Patent No.: US 9,896,912 B2
(45) Date of Patent: Feb. 20, 2018

(54) ACTIVE RECTIFIER FOR DOWNHOLE APPLICATIONS

(71) Applicants: Sebastian Tegeler, Hannover (DE); Steffen Toscher, Lueneburg (DE); Matthias Gatzen, Isernhagen (DE)

(72) Inventors: Sebastian Tegeler, Hannover (DE); Steffen Toscher, Lueneburg (DE); Matthias Gatzen, Isernhagen (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 422 days.

(21) Appl. No.: 14/711,319

(22) Filed: May 13, 2015

(65) Prior Publication Data

US 2016/0333670 A1    Nov. 17, 2016

(51) Int. Cl.
| | | |
|---|---|---|
| H02P 9/00 | (2006.01) | |
| E21B 41/00 | (2006.01) | |
| H02M 7/219 | (2006.01) | |

(52) U.S. Cl.
CPC ......... *E21B 41/0085* (2013.01); *H02M 7/219* (2013.01); *Y02B 70/1408* (2013.01)

(58) Field of Classification Search
CPC ....................................................... H02P 9/00
USPC ......................................... 318/615, 611, 560
See application file for complete search history.

(56) References Cited

U.S. PATENT DOCUMENTS

| | | | |
|---|---|---|---|
| 4,691,155 A | 9/1987 | Taylor et al. | |
| 4,975,979 A | 12/1990 | Baird | |
| 5,233,286 A | 8/1993 | Rozman et al. | |
| 5,744,877 A | 4/1998 | Owens | |
| 5,844,397 A | 12/1998 | Konecny et al. | |
| 6,038,152 A | 3/2000 | Baker | |
| 6,315,523 B1 * | 11/2001 | Mills | F04B 47/02 307/150 |

(Continued)

FOREIGN PATENT DOCUMENTS

| | | |
|---|---|---|
| DE | 19706371 A1 | 8/1998 |
| WO | WO2004061269 A1 | 7/2004 |

OTHER PUBLICATIONS

World Pumps; "Energy savings in submersible systems," Nov. 2011; www.worldpumps.com; 3 pages.

(Continued)

*Primary Examiner* — David S Luo
(74) *Attorney, Agent, or Firm* — Cantor Colburn LLP

(57) ABSTRACT

An apparatus for generating direct current (DC) electrical energy downhole at a selected voltage includes a drill tubular, a turbine to convert drilling fluid flow energy into rotational energy, an alternator coupled to the turbine to provide AC electrical energy, and an active rectifier configured to rectify the AC electrical energy into DC electrical energy at a controllable voltage. The active rectifier includes (a) a bridge circuit having a circuit branch having first and second rectifier sets including a semiconductor switch in parallel with a diode for each phase of the AC electrical energy and (b) a feedback control loop having a microprocessor and configured to receive an output voltage measurement and a voltage measurement and/or a current measurement in at least one circuit branch as an input and to provide a control signal to each semiconductor switch in order to provide the DC electrical energy at the selected voltage.

21 Claims, 6 Drawing Sheets

(56) References Cited

U.S. PATENT DOCUMENTS

| | | |
|---|---|---|
| 6,900,997 B2 | 5/2005 | Perreault et al. |
| 8,353,336 B2 | 1/2013 | Neuhaus et al. |
| 8,378,644 B2 | 2/2013 | Said et al. |
| 2003/0178960 A1 | 9/2003 | Kassing |
| 2011/0170320 A1 | 7/2011 | Coenen et al. |
| 2012/0119711 A1 | 5/2012 | Rozman et al. |
| 2013/0255933 A1 | 10/2013 | Shen |
| 2013/0314953 A1 | 11/2013 | Cuzner et al. |
| 2014/0104908 A1 | 4/2014 | Mehringer et al. |
| 2014/0354081 A1 | 12/2014 | Li et al. |

OTHER PUBLICATIONS

Notification of Transmittal of the International Search Report and the Written Opinion of the International Searching Authority, or the Declaration; PCT/US2016/031854; dated Sep. 1, 2016; 13 pages.

* cited by examiner

ACTIVE RECTIFIER FOR DOWNHOLE APPLICATIONS

BACKGROUND

Boreholes are drilled into the earth for many applications such as hydrocarbon production, geothermal production, and carbon dioxide sequestration. In order to efficiently use expensive resources drilling the boreholes, it is important for analysts to acquire detailed information related to the geologic formations being drilled.

Various types of tools referred to as downhole tools may be conveyed through the boreholes to perform various types of measurements to provide the analysts with the needed information. In order to make efficient use of drilling time, some downhole tools may be disposed on a drill string drilling a borehole so that measurements can be performed while the borehole is being drilled. These types of measurements may be referred to a logging-while-drilling or measurement-while-drilling.

Once the measurements are obtained, they can be transmitted by telemetry to a receiver at the surface of the earth so that they can be made quickly available to the analysts without having to remove the drill string from the borehole. One type of telemetry for while-drilling applications is mud-pulse telemetry. In mud-pulse telemetry, downhole data is encoded into a digital format and transmitted by pressure pulses in drilling mud filling the borehole or interior of the drill string. Power for the mud-pulse telemetry and downhole tools is generally electricity that is generated downhole. Hence, the drilling industry would appreciate any improvements in systems and methods to generate electricity downhole.

BRIEF SUMMARY

Disclosed is an apparatus for generating direct current (DC) electrical energy downhole at a selected voltage. The apparatus includes: a drill tubular configured to drill a borehole penetrating the earth; a turbine coupled to the drill tubular and configured to convert energy of drilling fluid flowing through the drill tubular into rotational energy of the turbine; an alternator configured to convert the rotational energy of the turbine into alternating current (AC) electrical energy; and an active rectifier coupled to the alternator and configured to rectify the AC electrical energy into DC electrical energy at a controllable voltage. The active rectifier includes (a) a bridge circuit comprising a circuit branch for each phase of the AC electrical energy, each circuit branch having a first rectifier set and a second rectifier set with a connection to the alternator between the first rectifier set and the second rectifier set, the first rectifier set having a semiconductor switch having power conducting terminals in parallel with a diode and configured to control a voltage across the first rectifier set, the second rectifier set having a semiconductor switch having power conducting terminals in parallel with a diode and configured to control a voltage across the second rectifier set and (b) a feedback control loop having a micro-processor, the feedback control loop being configured to receive an output voltage measurement and a voltage measurement and/or a current measurement in at least one circuit branch as an input and to provide a control signal to each semiconductor switch in order to provide the DC electrical energy at the selected voltage.

Also disclosed is an apparatus for generating direct current (DC) electrical energy downhole at a selected voltage. The apparatus includes: a drill tubular configured to drill a borehole penetrating the earth; a turbine coupled to the drill tubular and configured convert energy of drilling fluid flowing through the drill tubular into rotational energy of the turbine; an alternator configured to convert the rotational energy of the turbine into alternating current (AC) electrical energy; a magnetic clutch disposed between the turbine and the alternator; an active rectifier coupled to the alternator and configured to rectify the AC electrical energy into DC electrical energy at a controllable voltage, the active rectifier comprising (a) a bridge circuit comprising a circuit branch for each phase of the AC electrical energy, each circuit branch comprising a first rectifier set and a second rectifier set with a connection to the alternator between the first rectifier set and the second rectifier set, the first rectifier set comprising a semiconductor switch having power conducting terminals in parallel with a diode and configured to control a voltage across the first rectifier set, the second rectifier set comprising a semiconductor switch having power conducting terminals in parallel with a diode and configured to control a voltage across the second rectifier set and (b) a feedback control loop comprising a micro-processor, the feedback control loop being configured to receive an output voltage measurement and a voltage measurement and/or a current measurement in at least one circuit branch as an input and to provide a control signal to each semiconductor switch in order to provide the DC electrical energy at the selected voltage. The apparatus further includes a step-down voltage converter coupled to output of the active rectifier and configured to supply DC electrical power to a bus; a plurality of downhole tools coupled to the bus and configured to receive the DC electrical power from the bus and to transmit data; an inverter coupled to output of the active rectifier and configured to invert the DC electrical energy as the selected voltage to telemetry AC electrical energy; and a pulser-actuator coupled to output of the inverter and configured to actuate a mud-pulser to transmit an acoustic signal comprising the data in drilling fluid uphole to a receiver.

Further disclosed is a method for generating direct current (DC) electrical energy downhole. The method includes: disposing a drill tubular into a borehole penetrating the earth; flowing drilling fluid through the drill tubular; converting energy of the flowing drilling fluid to rotational energy using a turbine; converting the rotational energy of the turbine into alternating current (AC) electrical energy using an alternator; rectifying the AC electrical energy into DC electrical energy at a controllable voltage using an active rectifier, the active rectifier comprising (a) a bridge circuit having a circuit branch for each phase of the AC electrical energy, each circuit branch having a first rectifier set and a second rectifier set with a connection to the alternator between the first rectifier set and the second rectifier set, the first rectifier set having a semiconductor switch having power conducting terminals in parallel with a diode and configured to control a voltage across the first rectifier set, the second rectifier set having a semiconductor switch having power conducting terminals in parallel with a diode and configured to control a voltage across the second rectifier set and (b) a feedback control loop having a micro-processor, the feedback control loop being configured to receive an output voltage measurement and a voltage measurement and/or a current measurement in at least one circuit branch as an input and to provide a control signal to each semiconductor switch in order to provide the DC electrical energy at the selected voltage.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are method and apparatus for generating direct current (DC) electrical energy downhole at a selected voltage. The method and apparatus have the advantage of allowing the output voltage to be regulated independently of a downhole alternator output, which can vary with alternator rotational speed. The disclosed technology is capable of actively regulating a DC link bus voltage according to a constant voltage, the value of which can be selected. It is also capable of regulating up the alternator voltage. An active control loop regulates the behavior of the DC link bus voltage and is also able to positively influence and control transient behaviors and allows advanced alternator power management.

Figure 1:
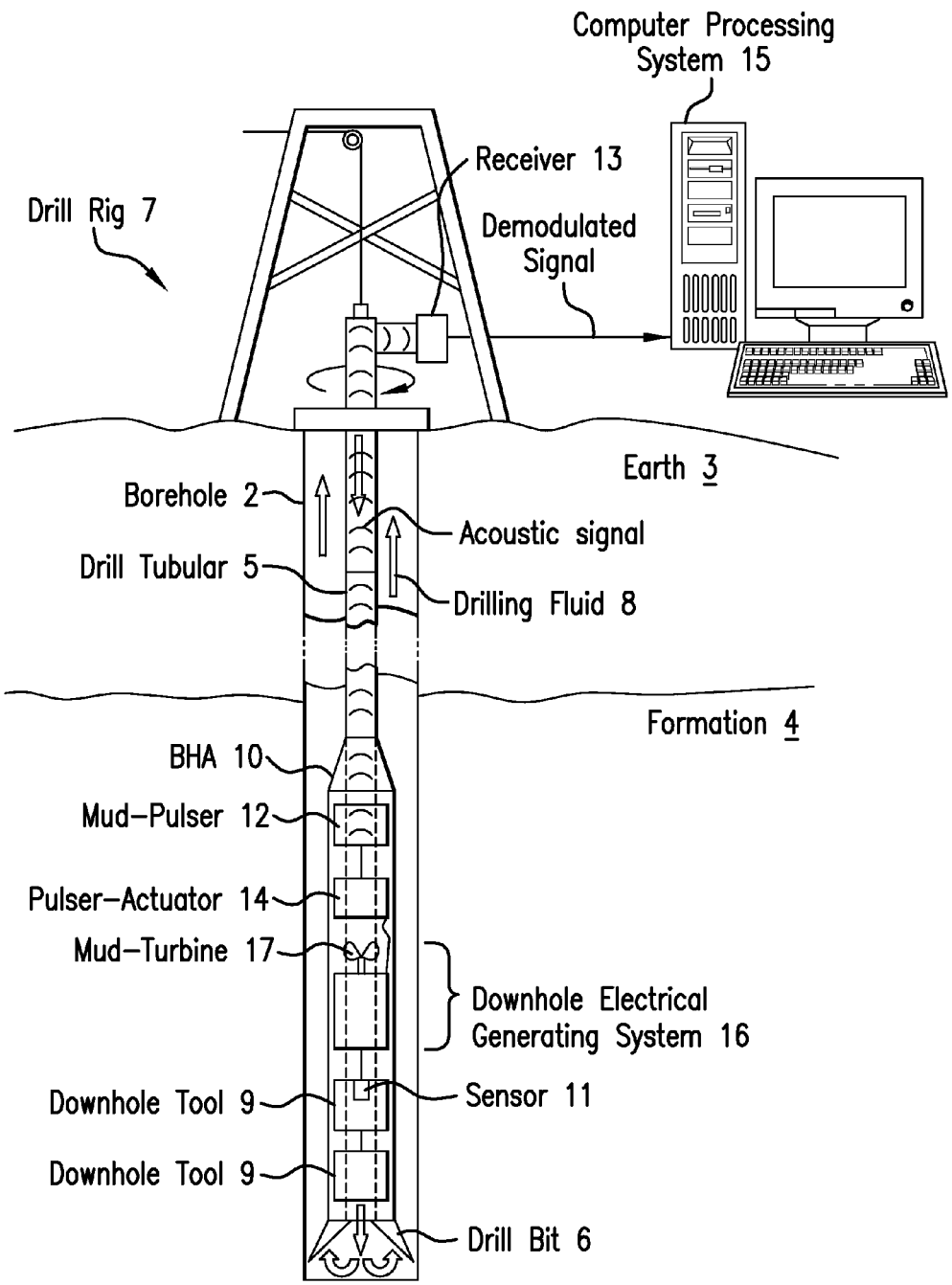
FIG. 1 illustrates a cross-sectional view of an embodiment of a downhole while-drilling tool disposed in a borehole penetrating the earth.

FIG. 1 illustrates a cross-sectional view of an embodiment of a bottomhole assembly (BHA) 10 disposed in a borehole 2 penetrating the earth 3, which includes an earth formation 4. The BHA 10 is conveyed through the borehole 2 by a drill tubular 5 such as jointed drill pipe or coiled tubing for example. A drill bit 6 is disposed at the distal end of the drill tubular 5. A drill rig 7 is configured to conduct drilling operations such as rotating the drill tubular 5 and thus the drill bit 6 in order to drill the borehole 2. In addition, the drill rig 7 is configured to pump drilling fluid 8, also referred to as drilling mud, through the drill tubular 5 in order to lubricate the drill bit 6 and flush cuttings from the borehole 2. The BHA 10 may include one or more various downhole tools 9 for performing various downhole functions or tasks such as sensing formation or borehole properties using a sensor 11 or performing mechanical functions such as withdrawing a formation fluid sample through a borehole wall. Non-limiting examples of the measurements performed by the sensor 11 include pressure, temperature, density, viscosity, compressibility, radiation, acoustic velocity, and spectroscopy using optical transmissivity or reflectivity for example.

Data sensed or collected downhole (i.e., in the borehole) is transmitted to the surface of the earth 3 by a mud-pulser 12 that is configured to transmit an acoustic pressure signal in the drilling fluid 8. At the surface, the acoustic signal is received by a receiver 13. Non-limiting embodiments of the mud-pulser 12 include a plunger valve and a shear valve. The mud-pulser 12 is actuated by a pulser-actuator 14. The pulser-actuator 14 is configured to receive data such as in the form of a bit stream from the various tools in the BHA 10 and to modulate the bit stream into a digital signal. The mud-pulser 12 transmits the digital signal as an acoustic pressure signal in the drilling fluid 8. The downhole tool 10 may also include memory (not shown) for storing measurements that cannot be immediately transmitted to the receiver 13 because of limited telemetry bandwidth.

The receiver 13 is configured to receive the acoustic pressure signal using a transducer (not shown). The transducer is configured to convert the received acoustic signal into an electrical signal that can be processed. The receiver 13 further includes a demodulator (not shown) configured to demodulate the acoustic pressure signal into an uphole bit stream (i.e., demodulated signal) that includes the downhole data. The uphole bit stream after further processing is in a format for displaying, storing, or further processing such as by a surface computer processing system 15.

Electrical power to power the downhole tools and other downhole electrical loads is generated downhole by a downhole electrical generating system 16 generally located in the BHA, but it may also be generated at other locations along the drill tubular 5. The downhole electrical generating system 16 includes a mud-turbine 17 that is configured to convert energy of the drilling fluid flowing in the drill tubular 5 into rotational energy that is then converted into direct current (DC) electrical energy at a selected and controllable voltage.

Figure 2:
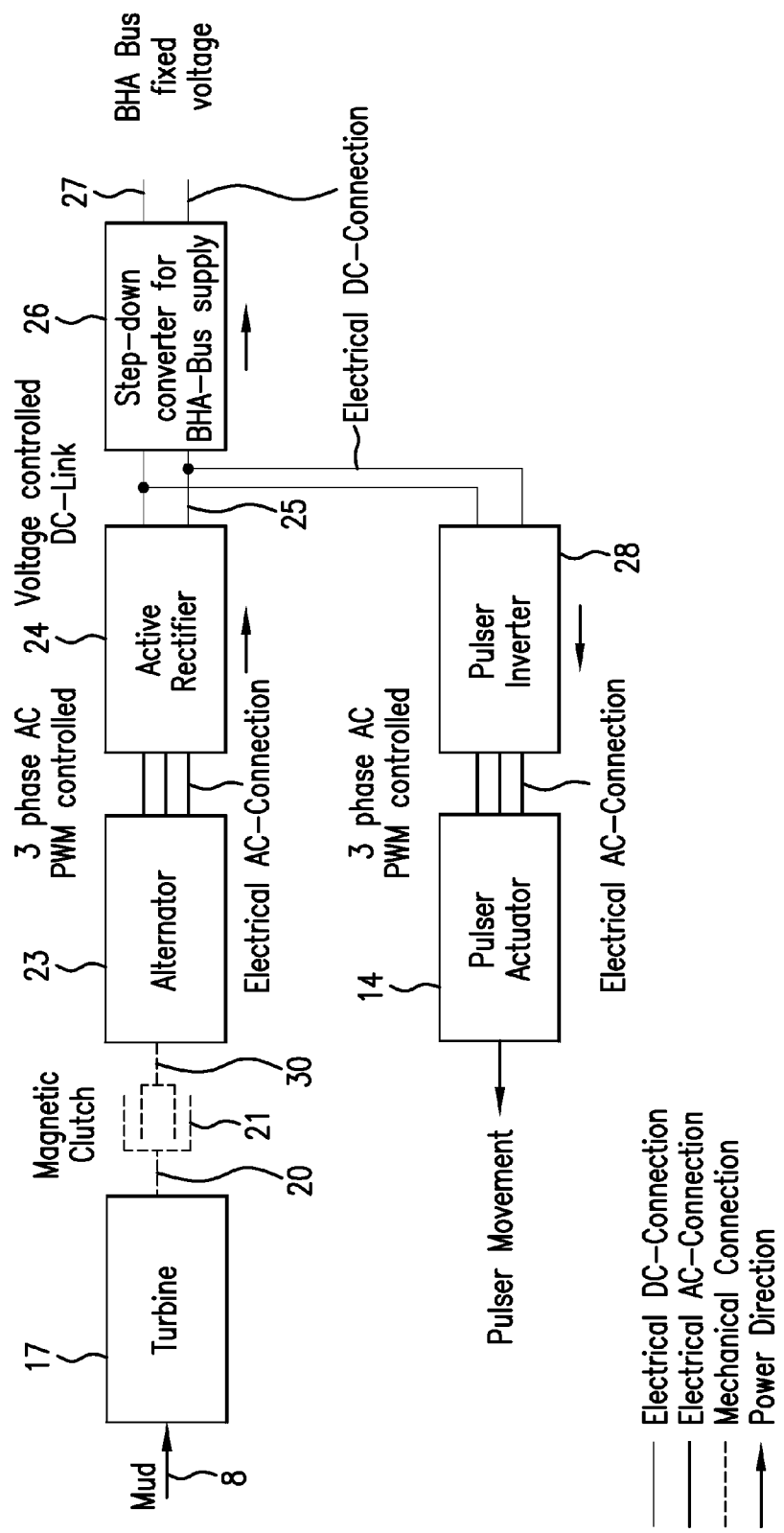
FIG. 2 depicts aspects of a downhole electrical generating system.

FIG. 2 depicts aspects of the downhole electrical generating system 16. The turbine 17 includes turbine blades that are configured to interact with the drilling fluid 8 to rotate the turbine blades which in turn rotate a turbine output shaft 20. The turbine output shaft 20 is coupled to a magnetic clutch 21. The magnetic clutch 21 is configured to transfer rotational energy from the turbine output shaft 20 to a clutch output shaft 22. The clutch output shaft 22 is mechanically coupled to an alternator 23. The alternator 23 is configured to generate alternating current (AC) electrical energy that may be single phase or multi-phase. In order to have high efficiency, power density and reliability, the alternator generally is a permanent magnet synchronous machine with a multiphase winding topology. In one or more embodiments, the generated AC electrical energy is three-phase. The AC electrical energy generated by the alternator 23 is provided to an active rectifier 24 that includes both passive (e.g., diodes) and active electrical components (e.g. transistors). The active rectifier 24 is configured to rectify the AC electrical energy into DC electrical energy that is regulated to provide a constant output voltage. The output voltage is selectable and may be varied depending on the application. Once the value of the output voltage is selected, it is maintained at that value until a signal is received directing the active rectifier 24 to change the value. The output of the active rectifier 24 may be referred to as a voltage controlled DC-link 25 as illustrated in FIG. 2.

A voltage converter 26 is coupled to the voltage controlled DC-link 25. The voltage converter 26 is configured to convert the voltage of the voltage controlled DC-link 25 to a voltage suitable for supplying electrical power to the various downhole tools 9. The electrical power at the converted voltage is supplied by a BHA bus 27. In the embodiment of FIG. 2, the voltage converter is a step-down converter. In other embodiments, the voltage converter may be a step-up converter. It can be appreciated that in one or more embodiments there may be multiple voltage converters each supplying a different voltage.

Still referring to FIG. 2, the voltage controlled DC-link 25 is coupled to a pulser inverter 28. The pulser inverter 28 is configured to invert the DC electrical power supplied by the voltage controlled DC-link 25 into single phase or multiphase AC electrical power that powers the pulser-actuator 14. In one or more embodiments, the AC electrical power supplied to the pulser-actuator 14 is three-phase. In one or more embodiments, the AC electrical power supplied to the pulser-actuator 14 is generated using pulse-width-modulation (PWM).

Figure 3:
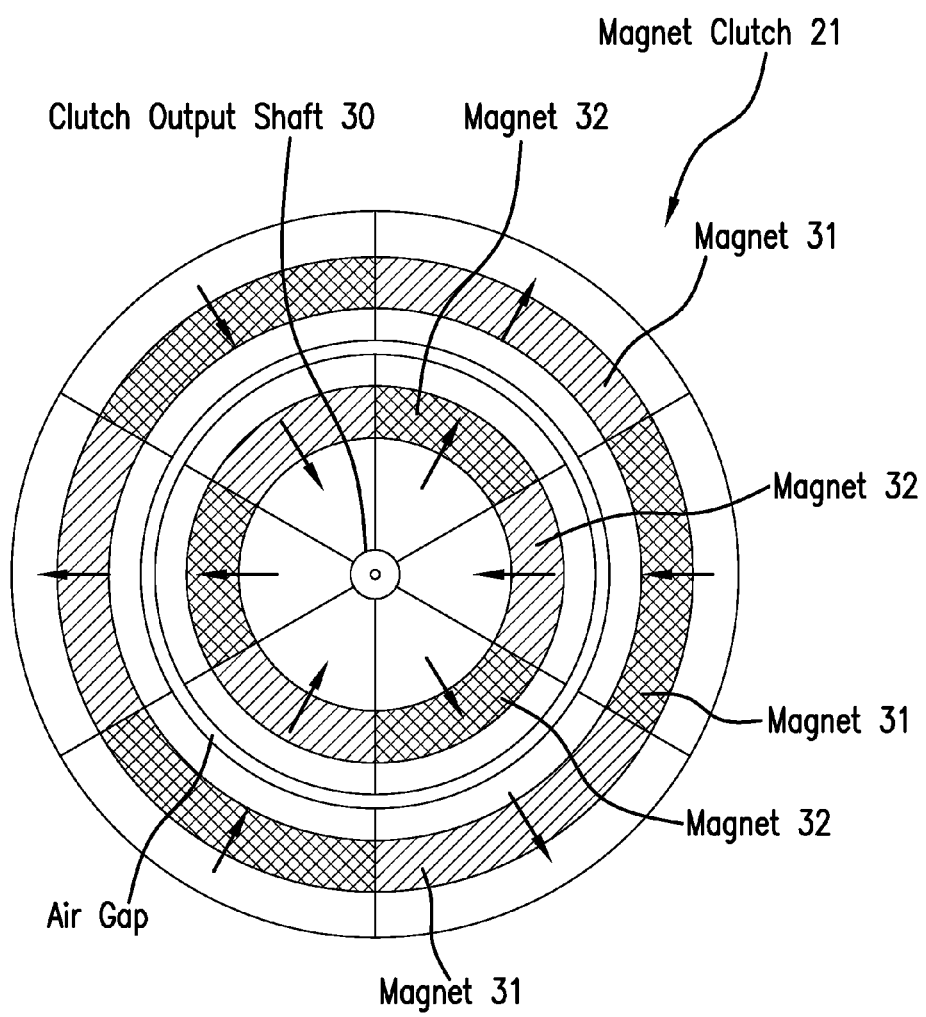
FIG. 3 depicts aspects of a magnetic clutch.

FIG. 3 depicts aspects of the magnetic clutch 21. The magnetic clutch uses magnets 31 that rotate with the turbine output shaft 20 to magnetically interact with magnets 32 coupled to a clutch output shaft 30 (also shown in FIG. 2). The magnetic interaction results in transferring rotational energy from the turbine output shaft 20 to the clutch output shaft 30. The magnetic clutch 21 transfers the turbine power to the alternator by separating the drilling fluid from the media in which the alternator runs in without any additional sealing.

Figure 4A:
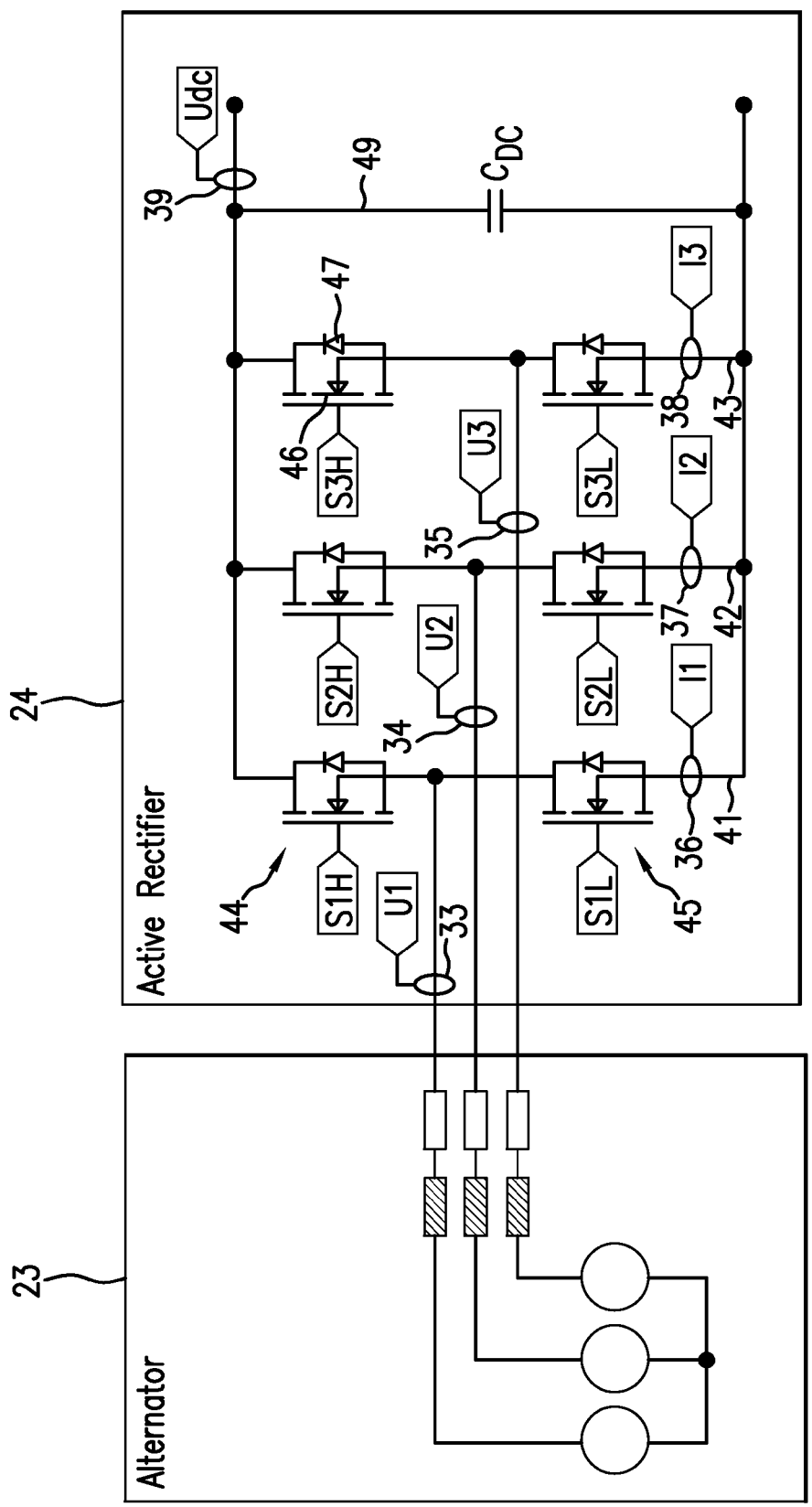
FIGS. 4A and 4B, collectively referred to as FIG. 4, depict aspects of an active rectifier coupled to an alternator.

FIG. 4 depicts aspects of the active rectifier 24 coupled to the alternator 23. In the three-phase embodiment of FIG. 4, the active rectifier 24 includes three circuit branches, a first rectifier circuit branch 41, a second rectifier circuit branch 42, and a third rectifier circuit branch 43, where each rectifier circuit branch is connected to a corresponding phase of the alternator 23 as illustrated in FIG. 4A. Each rectifier circuit branch (41, 42, 43) includes a first rectifier set 44 and a second rectifier set 45 with a connection to a phase of the alternator 23 between the first rectifier set 44 and the second rectifier set 45. Each rectifier set (44, 45) includes to a semiconductor switch 46 having power conducting terminals in parallel with a diode 47. Non-limiting embodiments of the semiconductor switch 46 include a metal-oxide-semiconductor-field-effect-transistor (MOSFET) having source and drain power terminals and an insulated-gate bipolar transistor (IGBT) having collector and emitter power terminals. In general, the power terminals are those terminals that do not include the gate. The diodes 47 enable the active rectifier to rectify the input AC electrical power when there is no electrical power to operate the semiconductor switches 46 such as during start-up. The circuit topology of the rectifier sets for three-phase rectification may be referred to as "B6C."

A filter 49 is provided at the output of the active rectifier 24 as illustrated in FIG. 4A to filter out voltage ripples. In the embodiment of FIG. 4A, the filter 49 is a capacitor $C_{DC}$.

Figure 4B:
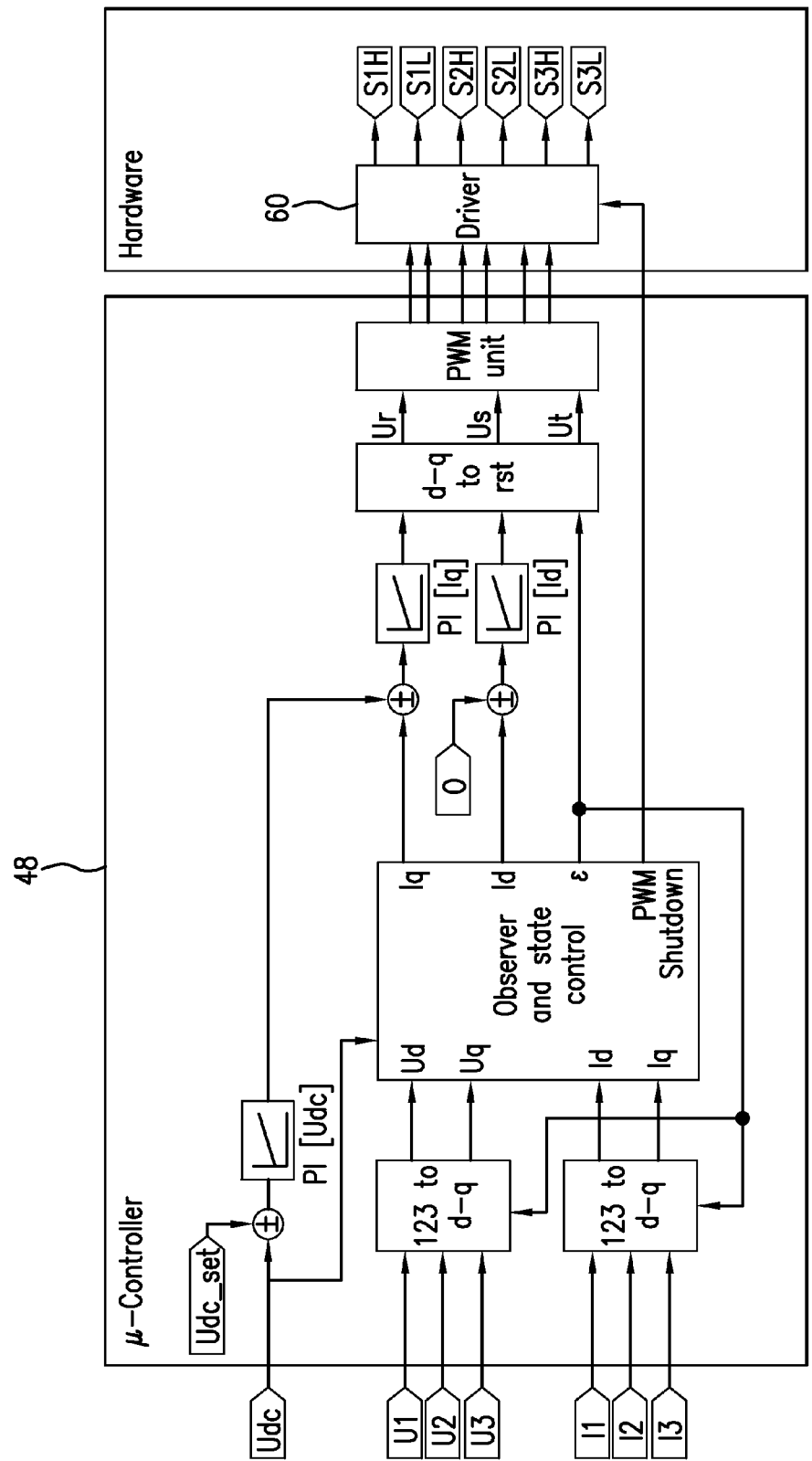

The semiconductor switches 46 are controlled by a micro-processor controller 48 via a semiconductor driver 60 as illustrated in FIG. 4B. The micro-processor controller 48 receives input from: electrical sensors 33, 34 and 35 in each output phase of the alternator 23; electrical sensors 36, 37 and 38 in each of the circuit branches 41, 42 and 43; and electrical sensor 39 at the voltage controlled DC-link 25. The electrical sensors 33-39 may be current sensors and/or voltage sensors. Voltage sensors are generally used for the passive mode of operation while current sensors are generally used for the active mode of operation. Using input from the electrical sensors 33-38, the micro-processor controller 48 turns the semiconductor switches 46 on and off in a pattern referred to as pulse-width-modulation (PWM). In PWM in one or more embodiments, only a portion of each half sine wave is rectified. The portion of each half sine wave is selected by the micro-processor controller 48 to provide the selected voltage to be regulated at the voltage controlled DC-link 25. In order to control the semiconductor switches 46 to provide PWM at the selected regulated voltage, the micro-processor controller 48 implements an algorithm. In one or more embodiments, the algorithm contains a direct-quadrature (d-q) transformation with a proportional-integral (PI) controller to control the d and q current as well as the DC link voltage Udc. The set point for the current Id is zero to reach a power factor close to one. That is, the d or direct component of current corresponds to the reactive current and, accordingly, the q or quadrature component corresponds to the active current. With Id (i.e., the reactive current) close to zero, the power factor is thus close to one. The controlled d-q voltage is transformed into values for the three phases for the PCM unit in the micro-processor controller, which calculates the PWM-signals for the semiconductor driver 49.

As illustrated in FIG. 4B, the micro-processor controller 48 receives the selected voltage set point to which the active rectifier 24 is to regulate the output voltage to at "Udc_set." Further illustrated in FIG. 4B is the "PWM Shutdown," which provides for shutting down the active rectifier 24. The PWM Shutdown is used to protect equipment from equipment faults such as faulty switching behavior of the semiconductor switches, which may lead to a high DC-link voltage. The PWM Shutdown also provides for starting and stopping the active rectifier 24 based on given input and/or output voltage levels. The active rectifier 24 can act as a step-up converter by employing the inductance in the alternator 23 and employing the DC link capacitor as energy storage elements. Stepping up an input voltage can be achieved by controlling the switching pattern for each rectifier set.

Figure 5:
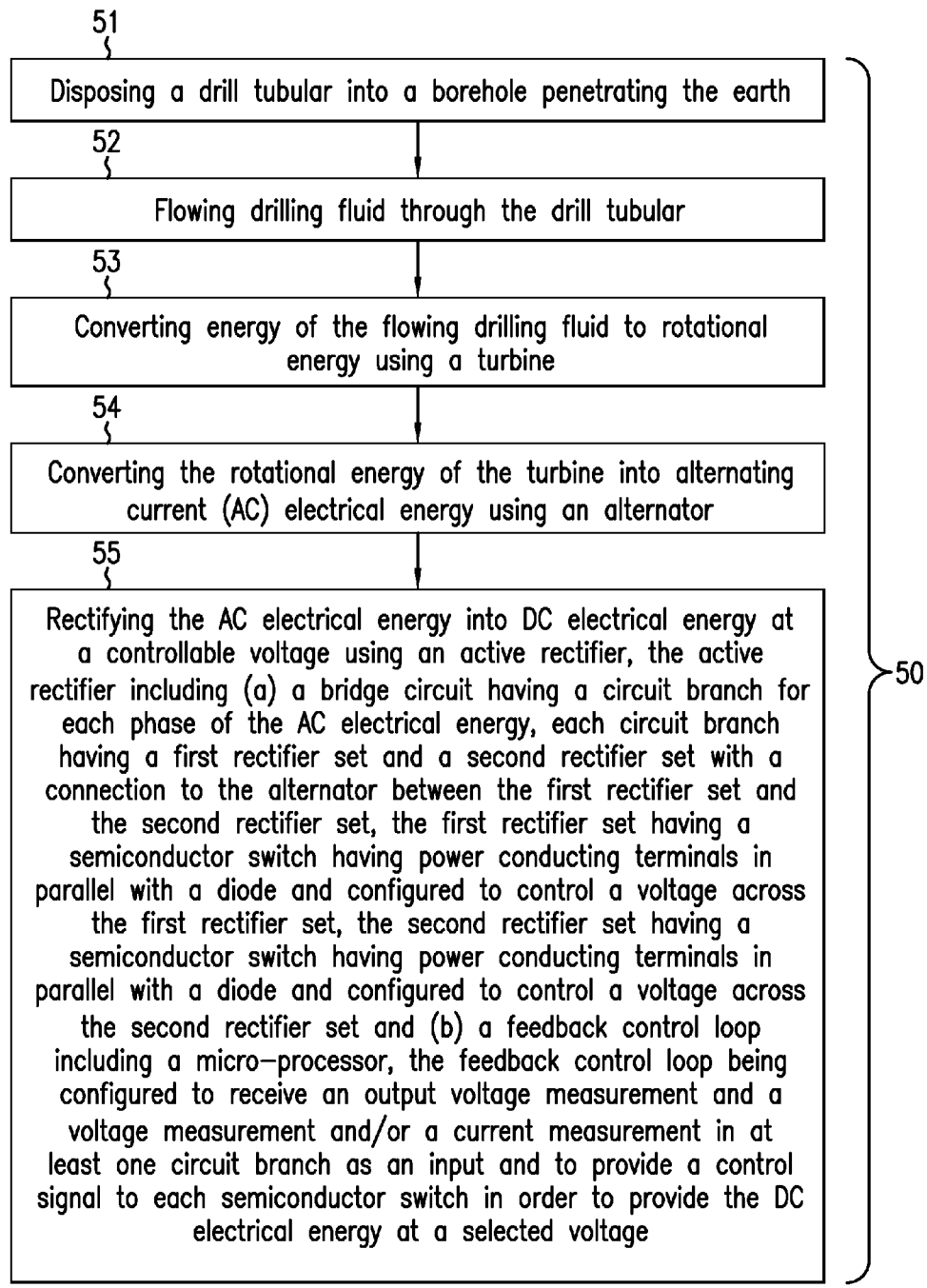
FIG. 5 is a flow chart for a method for generating direct current (DC) electrical power in the borehole.

FIG. 5 is a flow chart for a method 50 for generating direct current (DC) electrical energy downhole at a selected voltage. Block 51 calls for disposing a drill tubular such as a drill string into a borehole penetrating the earth. Block 52 calls for flowing drilling fluid through the drill tubular. Block 53 calls for converting energy of the flowing drilling fluid to rotational energy using a turbine. Block 54 calls for converting the rotational energy of the turbine into alternating current (AC) electrical energy using an alternator. Block 55 calls for rectifying the AC electrical energy into DC electrical energy at a controllable voltage using an active rectifier. The active rectifier includes (a) a bridge circuit having a circuit branch for each phase of the AC electrical energy, each circuit branch having a first rectifier set and a second rectifier set with a connection to the alternator between the first rectifier set and the second rectifier set, the first rectifier set having a semiconductor switch having power conducting terminals in parallel with a diode and configured to control a voltage across the first rectifier set, the second rectifier set having a semiconductor switch having power conducting terminals in parallel with a diode and configured to control a voltage across the second rectifier set and (b) a feedback control loop including a micro-processor, the feedback control loop being configured to receive an output voltage measurement and a voltage measurement and/or a current measurement in at least one circuit branch as an input and to provide a control signal to each semiconductor switch in order to provide the DC electrical energy at the selected voltage.

The method 50 may also include switching the semiconductor switch (including multiple switching) in each circuit branch on and off in each cycle of the AC electrical energy in a pulse-width modulation mode. The method 50 may also include receiving a signal at the rectifier where the signal includes the selected voltage that the active rectifier to provide as output. The method 50 may also include transmitting the rotational energy from the turbine to the alternator using a magnetic clutch. The method 50 may also include transmitting the DC electrical energy at the selected voltage from the active rectifier to an inverter configured to invert the DC electrical energy at the selected voltage to AC electrical energy to power telemetry. The method 50 may also include transmitting the AC electrical energy to power telemetry to a pulser-actuator configured to actuate a mud-pulser to transmit an acoustic signal in drilling fluid uphole to a receiver. The term "uphole" relates to the receiver being closer to the surface of the earth via the borehole. The method 50 may also include transmitting a plurality of signals comprising data from a plurality of downhole tools disposed on the drill tubular to the puller-actuator for transmission of the data uphole to a receiver. The method 50 may also include operating the active rectifier in a passive mode using the diode when the active rectifier receives AC electrical energy below a minimum voltage.

The apparatus and method disclosed herein provide several advantages. One advantage is the controllable and, in one or more embodiments constant DC voltage output from the active rectifier. This allows: (1) decoupling of active and passive electronic components from the variable voltage range of the alternator due to variations in the flow rate of the drilling fluid; (2) covering a larger drilling fluid flow rate range with one turbine-alternator combination, thus, negating the need for multiple turbine-alternator combinations to cover a wide flow rate range; (3) power management by actively converting energy between alternator and BHA loads (e.g., downhole tools) and vice versa and, thus, elimination of certain components in the BHA loads or other places that compensate for overvoltage; (4) active dampening of transient behaviors such as alternator voltage oscillations resulting from magnetic clutch oscillations; and (5) limitation of maximum DC output voltage from the active rectifier with an optional compensation circuit to ensure electronic survivability in overvoltage situations due to additional system components in the DC link, e.g. directly driven electric motor based subsystems. The compensation circuit is configured to compensate for potential voltage oscillations deriving from torsional oscillations of the magnetic clutch, which may act as a two mass/spring oscillator. Other advantages relating to providing power to mud-pulse telemetry include an increase in reliability and a decrease in the number of occurrences of data being lost in transmission due to unstable voltage causing the mud-pulser to send an unclear signal.

In support of the teachings herein, various analysis components may be used, including a digital and/or an analog system. For example, the BHA 10, the pulser-actuator 14, the downhole electrical generating system 16, active rectifier 24, the micro-processor controller 48, the voltage converter 26, the downhole sensor 8, the downhole tools 9, the receiver 13, and/or the computer processing system 15 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first," "second," and the like do not denote a particular order, but are used to distinguish different elements.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for generating direct current (DC) electrical energy downhole at a selected voltage, the apparatus comprising:

a drill tubular configured to drill a borehole penetrating the earth;

a turbine coupled to the drill tubular and configured to convert energy of drilling fluid flowing through the drill tubular into rotational energy of the turbine;

an alternator configured to convert the rotational energy of the turbine into alternating current (AC) electrical energy; and an active rectifier coupled to the alternator and configured to rectify the AC electrical energy into DC electrical energy at a controllable voltage, the active rectifier comprising (a) a bridge circuit comprising a circuit branch for each phase of the AC electrical energy, each circuit branch comprising a first rectifier set and a second rectifier set with a connection to the alternator between the first rectifier set and the second rectifier set, the first rectifier set comprising a semiconductor switch having power conducting terminals in parallel with a diode and configured to control a voltage across the first rectifier set, the second rectifier set comprising a semiconductor switch having power conducting terminals in parallel with a diode and configured to control a voltage across the second rectifier set and (b) a feedback control loop comprising a micro-processor, the feedback control loop being configured to receive an output voltage measurement and a voltage measurement and/or a current measurement in at least one circuit branch as an input and to provide a control signal to each semiconductor switch in order to provide the DC electrical energy at the selected voltage.

2. The apparatus according to claim 1, wherein the micro-processor is configured to switch the semiconductor switches in each circuit branch on and off in each cycle of the AC electrical energy in a pulse-width modulation mode.

3. The apparatus according to claim 1, further comprising a magnetic clutch disposed between the turbine and the alternator.

4. The apparatus according to claim 1, further comprising a step-down voltage converter coupled to output of the active rectifier and configured to supply DC electrical power to a bus.

5. The apparatus according to claim 1, wherein the bus is coupled to one or more downhole tools.

6. The apparatus according to claim 1, further comprising an inverter coupled to output of the active rectifier and configured to invert the DC electrical energy at the selected voltage to AC electrical energy.

7. The apparatus according to claim 6, further comprising an electrical load coupled to output of the inverter.

8. The apparatus according to claim 7, wherein the electrical load comprises telemetry.

9. The apparatus according to claim 8, wherein the telemetry comprises a puller-actuator coupled to the output of the inverter and configured to actuate a mud-pulser to transmit an acoustic signal in drilling fluid uphole to a receiver.

10. The apparatus according to claim 1, wherein the semiconductor switch comprises at least one selection from a group consisting of a MOSFET and an IGBT.

11. The apparatus according to claim 1, wherein the active rectifier is configured to operate in a passive mode using the diode when the active rectifier receives AC electrical energy below a minimum voltage.

12. The apparatus according to claim 1, wherein a processor in the feedback control loop is configured to receive an input corresponding to the selected voltage that the active rectifier is to maintain.

13. An apparatus for generating direct current (DC) electrical energy downhole at a selected voltage, the apparatus comprising:
a drill tubular configured to drill a borehole penetrating the earth;
a turbine coupled to the drill tubular and configured convert energy of drilling fluid flowing through the drill tubular into rotational energy of the turbine;
an alternator configured to convert the rotational energy of the turbine into alternating current (AC) electrical energy;
a magnetic clutch disposed between the turbine and the alternator;
an active rectifier coupled to the alternator and configured to rectify the AC electrical energy into DC electrical energy at a controllable voltage, the active rectifier comprising (a) a bridge circuit comprising a circuit branch for each phase of the AC electrical energy, each circuit branch comprising a first rectifier set and a second rectifier set with a connection to the alternator between the first rectifier set and the second rectifier set, the first rectifier set comprising a semiconductor switch having power conducting terminals in parallel with a diode and configured to control a voltage across the first rectifier set, the second rectifier set comprising a semiconductor switch having power conducting terminals in parallel with a diode and configured to control a voltage across the second rectifier set and (b) a feedback control loop comprising a micro-processor, the feedback control loop being configured to receive an output voltage measurement and a voltage measurement and/or a current measurement in at least one circuit branch as an input and to provide a control signal to each semiconductor switch in order to provide the DC electrical energy at the selected voltage;
a step-down voltage converter coupled to output of the active rectifier and configured to supply DC electrical power to a bus;
a plurality of downhole tools coupled to the bus and configured to receive the DC electrical power from the bus and to transmit data;
an inverter coupled to output of the active rectifier and configured to invert the DC electrical energy as the selected voltage to telemetry AC electrical energy; and
a pulser-actuator coupled to output of the inverter and configured to actuate a mud-pulser to transmit an acoustic signal comprising the data in drilling fluid uphole to a receiver.

14. A method for generating direct current (DC) electrical energy downhole at a selected voltage, the method comprising:
disposing a drill tubular into a borehole penetrating the earth;
flowing drilling fluid through the drill tubular;
converting energy of the flowing drilling fluid to rotational energy using a turbine;
converting the rotational energy of the turbine into alternating current (AC) electrical energy using an alternator;
rectifying the AC electrical energy into DC electrical energy at a controllable voltage using an active rectifier, the active rectifier comprising (a) a bridge circuit comprising a circuit branch for each phase of the AC electrical energy, each circuit branch comprising a first rectifier set and a second rectifier set with a connection to the alternator between the first rectifier set and the second rectifier set, the first rectifier set comprising a semiconductor switch having power conducting terminals in parallel with a diode and configured to control a voltage across the first rectifier set, the second rectifier set comprising a semiconductor switch having power conducting terminals in parallel with a diode and configured to control a voltage across the second rectifier set and (b) a feedback control loop comprising a micro-processor, the feedback control loop being configured to receive an output voltage measurement and a voltage measurement and/or a current measurement in at least one circuit branch as an input and to provide a control signal to each semiconductor switch in order to provide the DC electrical energy at the selected voltage.

15. The method according to claim 14, further comprising switching the semiconductor switch in each circuit branch on and off in each cycle of the AC electrical energy in a pulse-width modulation mode.

16. The method according to claim 14, further comprising receiving a signal at the rectifier where the signal includes the selected voltage that the active rectifier to provide as output.

17. The method according to claim 14, further comprising transmitting the rotational energy from the turbine to the alternator using a magnetic clutch.

18. The method according to claim 14, further comprising transmitting the DC electrical energy at the selected voltage from the active rectifier to an inverter configured to invert the DC electrical energy at the selected voltage to AC electrical energy provided to an electrical load.

19. The method according to claim 18, wherein the electrical load comprises mud-pulse telemetry and the method further comprises transmitting the AC electrical energy provided to a pulser-actuator configured to actuate a mud-pulser to transmit an acoustic signal in drilling fluid uphole to a receiver.

20. The method according to claim 19, further comprising transmitting a plurality of signals comprising data from a plurality of downhole tools disposed on the drill tubular to the pulser-actuator for transmission of the data uphole to a receiver.

21. The method according to claim 14, further comprising operating the active rectifier in a passive mode using the diode when the active rectifier receives AC electrical energy below a minimum voltage.

* * * * *